United States Patent
Wang et al.

(10) Patent No.: US 6,228,922 B1
(45) Date of Patent: May 8, 2001

(54) METHOD OF MAKING CONDUCTIVE METAL-CONTAINING POLYMER FIBERS AND SHEETS

(75) Inventors: Chyi-Shan Wang, Beavercreek; Jar-Wha Lee, Hilliard; Richard A. Vaia, Dayton, all of OH (US)

(73) Assignee: The University of Dayton, Dayton, OH (US)

( * ) Notice: Subject to any disclaimer, the term of this patent is extended or adjusted under 35 U.S.C. 154(b) by 0 days.

(21) Appl. No.: 09/232,931

(22) Filed: Jan. 19, 1999

Related U.S. Application Data

(60) Provisional application No. 60/071,779, filed on Jan. 19, 1998.

(51) Int. Cl.[7] .................................................. C08K 3/10
(52) U.S. Cl. ........................ 524/413; 524/439; 524/440; 524/441; 524/609; 524/611
(58) Field of Search .............................. 524/90, 430, 413, 524/440, 441, 604, 611; 252/518; 8/115.5, 491; 428/361, 372, 379, 392, 297.7, 301

(56) References Cited

U.S. PATENT DOCUMENTS

| | | |
|---|---|---|
| 3,014,818 * 12/1961 | Campbell | 117/227 |
| 4,267,233    5/1981 | Tanaka et al. . | |
| 4,378,226 *  3/1983 | Tomibe et al. | 8/491 |
| 4,681,820 *  7/1987 | Tomibe et al. | 428/698 |
| 4,759,986 *  7/1988 | Marirkar et al. | 428/389 |
| 4,963,616 * 10/1990 | Jenekhe | 524/600 |
| 5,049,684 *  9/1991 | Tomibe et al. | 556/113 |
| 5,549,972 *  8/1996 | Hsu et al. | 428/398 |
| 5,968,854 * 10/1999 | Akopian et al. | 442/132 |
| 6,001,475 * 12/1999 | Hsu | 428/370 |

OTHER PUBLICATIONS

Edward W. Tokarsky et al, "Metal Clad Aramid Fibers for Aerospace Wire and Cable" Jul. 18 & 19, 1995.

* cited by examiner

*Primary Examiner*—Edward J. Cain
*Assistant Examiner*—K Wyrozebski Lee
(74) *Attorney, Agent, or Firm*—Killworth, Gottman, Hagan & Schaeff, L.L.P.

(57) ABSTRACT

A method is provided for forming a highly conductive metal-containing polymer fiber or sheet in which a polymer is immersed in a solution containing a metal precursor selected from organic or inorganic salts of copper, silver, aluminum, gold, iron and nickel. The metal precursor is then reduced by chemical, electrochemical, or thermal means such that conductive metal is incorporated into the polymer.

14 Claims, No Drawings

METHOD OF MAKING CONDUCTIVE METAL-CONTAINING POLYMER FIBERS AND SHEETS

CROSS REFERENCE TO RELATED APPLICATIONS

This application claims the benefit of U.S. provisional application Serial No. 60/071,779 filed Jan. 19, 1998.

GOVERNMENT RIGHTS

The Government has rights in this invention pursuant to Contract No. F33615-93-D-5044 awarded by the United States Air Force.

BACKGROUND OF THE INVENTION

The present invention relates to a method for fabricating metal-containing polymer fibers or sheets having high electrical conductivity, and more particularly, to a method which utilizes an in-situ chemical, electrochemical, or thermal reduction of metal salts infiltrated into such polymer fiber or sheets.

Electrical wires are made of highly conductive metals such as copper and silver. These metals afford the highest conductivity (approximately $6 \times 10^5$ S cm$^{-1}$ at room temperature) for power, signal and EMI shielding applications. However, their high density, e.g. 10.5 g cm$^{-3}$ for silver and 8.96 g cm$^{-3}$ for copper, is undesirable for applications in space and aerospace vehicles where weight savings are important. Attempts have been made to replace the 22 gauge copper wire currently used in aerospace vehicles with a smaller 26 gauge or 30 gauge wire, but the thinner wires do not have the necessary mechanical strength and durability and therefore cannot be used. During the past twenty years, considerable research effort has been spent on developing conducting polymers for optoelectronic applications. Conjugated polymers such as polyacetylene, polythiophene and polypyrrole have been introduced with electrical conductivity up to $10^5$ S cm$^{-1}$ by chemical and electrochemical doping. However, these highly conductive doped conjugated polymers are environmentally unstable and therefore have few practical applications.

In recent years, a new class of conductive fibers (Aracon® available from DuPont) has been developed by cladding Kevlar® (DuPont) fibers with highly conductive metals such as nickel, copper and silver. Because the interior Kevlar® fiber has a tensile strength of 425 Ksi, Young's modulus of 12–25 Msi, density of 1.4 g cm$^{-3}$ and diameter of 15 $\mu$m, the Aracon® fibers offer benefits over copper wires in flexibility, weight savings (60% in braid and 26% in cable), strength and durability, tailored electrical/mechanical properties, and more uniform EMI shielding. However, the Aracon® fibers have several disadvantages resulting from the fact that the metals are coated only on the surface of the Kevlar® fiber. For example, the fibers may suffer from potential fatigue or delamination in thermal or mechanical cycles. Second, the fibers have a poor EMI shielding below 25 MHz because the interior Kevlar® fiber is an insulator.

Accordingly, there is still a need in the art for a method which allows highly conductive metals to be incorporated into a polymer matrix such as a fiber or sheet to form a lightweight material containing a low volume fraction of metal but which has high metallic conductivity.

SUMMARY OF THE INVENTION

The present invention meets those needs by providing a method for fabricating highly conductive metal-containing polymers such as fibers and sheets in which metal precursors are infiltrated into the polymer and then reduced by chemical, electrochemical, or thermal means.

According to one aspect of the present invention, a method for forming a highly conductive metal-containing polymer is provided comprising the steps of providing a polymer, immersing the polymer in a solution containing a metal precursor, and then converting the metal precursor to metal such that conductive metal is entrapped in the polymer.

The metal precursor is preferably selected from the group consisting of organic or inorganic salts of copper, silver, aluminum, gold, iron and nickel. In a preferred embodiment, the metal precursor solution comprises an aqueous silver nitrate solution.

The polymer is preferably selected from the group consisting of poly(p-phenylene benzobisthiazole), poly(p-phenylene benzobisoxazole), poly(p-phenylene benzobisimidazole), poly(imidazoisoquinolines), poly(p-phenylene terephthalamide) and nylon. Preferably, the polymer comprises poly(p-phenylene benzobisthiazole).

The polymer may be provided in the form of a fiber or sheet. Where the polymer is provided in the form of a fiber, the fiber is preferably infiltrated with metal after being produced through an extrusion/coagulation process, i.e., the fiber is coagulated in a solution such as phosphoric acid and is wet prior to being immersed in the metal precursor solution. Alternatively, a fiber in dry form may be infiltrated by swelling the fiber in a solvent solution prior to being immersed in the metal precursor solution.

In a preferred embodiment of the invention, the method utilizes a chemical reduction in which the converting step comprises immersing the polymer in an aqueous solution containing a reducing agent. In this embodiment, the reducing agent preferably comprises sodium borohydrate.

In an alternative embodiment of the invention, the method utilizes a thermal reduction in which the converting step comprises heating the polymer at a temperature of about 250° C.

In yet another alternative embodiment of the invention, the method utilizes an electrochemical reduction in which the converting step includes providing iron in a concentrated HCl solution (anode), where the polymer immersed in the metal precursor solution comprises a cathode.

After the metal is infiltrated into the polymer, the polymer is preferably further heat treated at a temperature of between about 300° C. to 500° C. to enhance conductivity. The heat treated polymer preferably has a room temperature conductivity of up to about $10^4$ to about $10^5$ S cm$^{-1}$.

In addition to exhibiting high electrical conductivity, the resulting metal-containing polymers also exhibit good thermal and thermooxidative stability, mechanical flexibility, durability and strength, are lightweight. The polymers may be used in applications such as signal and power transfer and EMI shielding as well as satellite antennas and microelectronics applications. For example, the replacement of metal signal wires in existing aircraft and satellites with conductive metal-containing polymer fibers will result in a substantial weight savings, leading to enhanced system performance. The method of the present invention may also be used to fabricate metallized polymer sheets with high electrical conductivity for satellite charge dissipation and semiconductor on-chip applications or with high surface reflectivity for inflatable space membrane antenna and collector applications.

Accordingly, it is a feature of the present invention to provide a method for producing metal-containing polymers having high electrical conductivity. This, and other features and advantages of the present invention will become apparent from the following detailed description and the appended claims.

DETAILED DESCRIPTION OF THE PREFERRED EMBODIMENT

The method of the present invention provides a process which allows highly conductive metals to be incorporated into a polymer matrix such as a fiber or sheet and form a continuous network which results in high electrical conductivity. The resulting polymer is light-weight and contains a low volume fraction of metal but has a metallic conductivity comparable with current state-of-the-art materials.

The metal precursors may be incorporated into the polymer by codissolution with the polymer in a common solvent prior to fabrication into a fiber or sheet, or by infiltration after the fiber or sheet is formed. The metal precursors are then reduced to a conductive metal by thermal, chemical, or electrochemical methods. Preferred metal precursors for use in the present invention include organic or inorganic salts of copper, silver, aluminum, gold, iron and nickel.

Polymers suitable for use in the present invention include those which may be formed into fibers or sheets by a coagulation process or those that can be swelled in a solvent to allow infiltration of the metal precursors. Preferred polymers include rigid-rod polymers such as poly(p-phenylene benzobisthiazole)(PBZT, commercially available from SRI International), poly (p-phenylene benzobisoxazole)(PBO, commercially available from Toyobo under the designation Zylon®), poly(p-phenylene benzobisimidazole) (PBI), ladder polymers such as poly(imidazoisoquinolines) (BBL), extended-chain polymers such as poly(p-phenylene terephthalamide) (PPTA, commercially available from DuPont under the designation Kevlar®) and flexible chain polymers such as nylon. The preferred polymers for use in the present invention are PBZT, PBO, and PPTA. These polymers are lyotropic liquid crystalline polymers which are soluble in strong acids such as polyphosphoric acid and sulfuric acid. When these polymers are dissolved in such acids, the resulting concentrated solutions may be extruded and coagulated to form high-strength, high-modulus fibers or sheets.

For example, in a preferred method of the present invention which utilizes chemical reduction, a PBZT fiber may be extruded from its polyphosphoric acid reaction mixture and coagulated in an aqueous phosphoric acid solution. The wet fiber is then immersed in a metal precursor solution such as an aqueous silver nitrate solution which precipitates into the fiber as silver phosphate. The PBZT fiber is then soaked in a reducing agent such as an aqueous sodium borohydrate solution to reduce the silver phosphate to silver. The silver-infiltrated PBZT fiber is then preferably washed with water to remove impurities and dried for post-heat treatment.

The amount and distribution of silver in the fiber can be adjusted by varying the duration and conditions of the infiltration and reduction processes, such as the concentration and temperature of the coagulating solution, the metal precursor solution, and the reducing agent. As a result, the conductivity of the fiber can be adjusted over a wide range. With the process of the present invention, even a dry fiber can be made conductive by swelling the fiber in a solvent such as sulfuric acid prior to infiltration of the metal precursors.

In order that the invention may be more readily understood, reference is made to the following examples, which are intended to be illustrative of the invention, but are not intended to be limiting in scope.

EXAMPLE 1

Chemical Reduction

A 13.7 wt % PBZT/PPA (polyphosphoric acid) solution, after being homogenized in a Haake Rheomixer at 130° C. for 4 hours, was filtered and deaerated at 80° C. through a 74 $\mu$m stainless steel mesh. The solution was then extruded at 80 to 100° C. through a 0.010 in. spinneret into a single filament fiber by a dry-jet, wet-spin process. This fiber was highly stretched during processing and a draw ratio of take-up speed to extrusion rate of about 60 was obtained. The fiber was coagulated in a 10 wt % aqueous phosphoric acid solution. The wet PBZT fiber was then immersed in a 50 wt % aqueous silver nitrate solution at room temperature for approximately 45 seconds to allow silver phosphate to precipitate in the fiber. The fiber was then placed in a 0.5 wt % sodium borohydrate solution for about 30 seconds to reduce the silver phosphate. The fiber was eventually washed with distilled water to remove solvent residue and other chemical agents. This fiber after being air-dried had a diameter of 35 $\mu$m and showed a metallic surface. Its room temperature dc conductivity was $3 \times 10^3$ S cm$^{-1}$.

EXAMPLE 2

Chemical Reduction

A PBZT fiber was formed by a dry-jet, wet-spin process as in Example 1 and then coagulated in a 10 wt % phosphoric acid solution. The fiber was then immersed in a 70 wt % silver nitrate solution at room temperature for approximately 45 seconds, and was subsequently soaked in a 2 wt % sodium borohydrate solution for approximately 60 seconds. The fiber was then thoroughly washed with distilled water to remove residual solvent and other chemicals. After being dried, the fiber showed a room temperature dc conductivity of $1.5 \times 10^4$ S cm$^{-1}$. Scanning electron microscopy (SEM) revealed a microfibrillar structure of the fiber. Transmission electron microscopy showed that the infiltrated silver was concentrated near the surface of the fiber with a penetration depth of approximately 2 to 3 $\mu$m. This penetration depth amounts to approximately 20% of the cross-sectional area of the fiber, indicating that the fiber conductivity may be further increased by infiltrating more metal into the fiber. After the fiber was heat-treated at 450° C. for 30 seconds under nitrogen, its conductivity was increased to $2.5 \times 10^4$ S cm$^{-1}$.

EXAMPLE 3

Electrochemical Reduction

A dry-jet, wet-spun PBZT fiber was coagulated in a 10 wt % phosphoric acid solution and then immersed in a 70 wt % silver nitrate solution at room temperature for approximately 45 seconds. The silver-phosphate containing fiber (cathode) was placed in contact with iron as the anode in a concentrated HCl solution. Wide-angle X-ray diffraction (WAXD) clearly showed reduction of the silver phosphate after it was in contact with the iron anode in the HCl solution. After being dried, the fiber exhibited a room temperature conductivity of $1.5 \times 10^3$ S cm$^{-1}$. SEM revealed a thin coating of silver on the fiber surface.

EXAMPLE 4

Electrochemical Reduction

A silver phosphate-containing PBZT fiber was prepared as in Example 3 but was allowed to dry in ambient conditions for about 1 minute prior to being electrochemically reduced. This fiber showed a room temperature dc conductivity of $1.2 \times 10^4$ S cm$^{-1}$ after being washed and air-dried. After heat treatment at 450° C. for 30 seconds under dry nitrogen environment, the fiber showed an improved electrical conductivity of $2.0 \times 10^4$ S cm$^{-1}$. No apparent loss of fiber mechanical properties was observed after heat treatment.

EXAMPLE 5

Thermal Reduction

A PBZT fiber extruded from a PPA reaction mixture as in Example 1 was coagulated in a saturated sodium carbonate solution. The sodium carbonate-containing PBZT fiber was then soaked in a concentrated silver nitrate solution to allow silver carbonate to precipitate in the fiber. The silver carbonate-containing fiber was then washed in a saturated silver acetate solution (approximately 1 to 2 wt %) to remove Na$^+$ and NO$_3^{-1}$. The fiber was then heat-treated at 250° C. overnight. The resulting fiber showed a surface silver coating and had a room temperature dc conductivity of 425 S cm$^{-1}$.

EXAMPLE 6

Chemical Stability

A poly(p-phenylene benzobisoxazole) (PBO) fiber was processed from a 14 wt % polyphosphoric acid (PPA) dope at 90° C. by a dry-jet, dry-spinning method using a 0.015 inch spinneret. The fiber was air-cooled and collected on a take-up drum. A draw ratio of 40–50 was achieved for this fiber (defined as the ratio of the take-up speed to the extrusion rate). A 10-foot segment of the PBO fiber was coagulated in water to remove PPA and was subsequently air-dried. This fiber was designated as pristine fiber. Another 10-foot segment of the PBO fiber was immersed in a 55 wt % silver nitrate solution for 10 minutes to allow formation of silver salts in the fiber. The fiber was then soaked in a 2 wt % NaBH$_4$ solution for 10 minutes to reduce the silver salts. This fiber was designated as silver-infiltrated PBO fiber. Mechanical properties of the pristine and silver-infiltrated PBO fibers were characterized with an Instron tensile test machine and are reported in Table 1. The silver-infiltrated PBO fiber showed a slightly large diameter than the pristine fiber. The tensile strengths of the two fibers are identical within experimental error when the effect of fiber diameter is taken into consideration. However, the Young's modulus of the silver-infiltrated PBO fiber is less than that of the pristine fiber due to the infiltrated metal salt. Since neither of the two fibers has been heat-treated at elevated temperatures under tension, their Young's moduli are not as high. In comparing the tensile strengths of the two PBO fibers, it can be concluded that the PBO fiber did not degrade due to the infiltration and the reduction of the silver salts.

TABLE 1

| Fiber (PBO) | Diameter ($\mu$m) | Tensile Strength (Ksi) | Young's Modulus (Msi) |
|---|---|---|---|
| Pristine | 40 | 320 | 12 |
| Silver-infiltrated | 45 | 260 | 7 |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for forming a highly conductive metal-containing polymer consisting essentially of:
   providing a polymer;
   immersing said polymer in a solution containing a metal precursor;
   converting said metal precursor to metal such that conductive metal is entrapped in said polymer; wherein said metal-containing polymer has a room temperature conductivity from about $10^3$ to about $10^4$ S cm$^{-1}$.

2. The method of claim 1 in which said polymer is in the form of a fiber or sheet.

3. The method of claim 1 in which said polymer is in the form of a wet fiber which has been coagulated in a solution prior to being immersed in said metal precursor solution.

4. The method of claim 1 in which said polymer is extruded from a solution directly into said metal precursor solution.

5. The method of claim 1 in which said polymer is in the form of a dry fiber which has been swelled in a solvent solution prior to being immersed in said metal precursor solution.

6. The method of claim 1 in which said converting step comprises immersing said polymer in an aqueous solution containing a reducing agent.

7. The method as claimed in claim 6 wherein said reducing agent comprises sodium borohydrate.

8. The method of claim 1 in which said converting step comprises heating said polymer at a temperature of about 250° C.

9. The method of claim 1 in which said converting step comprises electrochemically reducing said polymer; wherein said polymer immersed in said metal precursor solution comprises a cathode and iron is provided in a concentrated HCl solution which comprises an anode.

10. A method for forming a highly conductive metal-containing polymer consisting essentially of:
    providing a polymer;
    immersing said polymer in a solution containing a metal precursor;
    converting said metal precursor to metal such that conductive metal is entrapped in said polymer; and
    heating said polymer at a temperature of between about 300° C. to 500° C.; wherein said metal-containing polymer has a room temperature conductivity from about $10^4$ to about $10^5$ S cm$^{-1}$.

11. The method as claimed in claim 1 in which said polymer is selected from the group consisting of poly(p-phenylene benzobisthiazole), poly (p-phenylene benzobisoxazole), poly(p-phenylene benzobisimidazole) (PBI), poly(imidazoisoquinolines) (BBL), poly(p-phenylene terephthalamide) (PPTA) and nylon.

12. The method as claimed in claim 1 in which said polymer comprises poly(p-phenylene benzobisthiazole).

13. The method as claimed in claim 1 wherein said metal precursor is selected from the group consisting of organic or inorganic salts of copper, silver, aluminum, gold, iron and nickel.

14. The method as claimed in claim 1 wherein said metal precursor solution comprises an aqueous silver nitrate solution.

* * * * *